(12) United States Patent  (10) Patent No.: US 8,837,898 B2
Davidson et al.  (45) Date of Patent: Sep. 16, 2014

(54) PROXIMITY-BASED VIDEO PLAYBACK SYNCHRONIZATION

(71) Applicants: Ryan S. Davidson, Austin, TX (US); Calvin H. Watson, Austin, TX (US)

(72) Inventors: Ryan S. Davidson, Austin, TX (US); Calvin H. Watson, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/625,364

(22) Filed: Sep. 24, 2012

(65) Prior Publication Data

US 2014/0086549 A1  Mar. 27, 2014

(51) Int. Cl.
*H04N 5/935*   (2006.01)
*H04N 5/932*   (2006.01)
*H04N 5/931*   (2006.01)
*H04N 5/775*   (2006.01)
*H04N 5/77*    (2006.01)
*H04B 3/36*    (2006.01)
*H04B 7/14*    (2006.01)
*H04B 7/15*    (2006.01)
*H04B 7/19*    (2006.01)
*H04B 7/185*   (2006.01)

(52) U.S. Cl.
USPC ........... 386/201; 386/202; 386/207; 386/230; 386/235; 455/7; 455/11.1; 455/13.1; 455/13.2; 455/18

(58) Field of Classification Search
CPC ................. G11B 27/105; G11B 27/34; G11B 2220/2579; H04N 5/765; H04N 5/907
USPC .............. 386/201, 202, 207, 230, 235; 455/7, 455/11.1, 13.1, 13.2, 18
See application file for complete search history.

(56) References Cited

U.S. PATENT DOCUMENTS

2005/0233742 A1* 10/2005 Karaoguz et al. .......... 455/432.3
2012/0113964 A1*  5/2012 Petersen et al. ............... 370/338
2012/0159026 A1*  6/2012 Kataoka et al. ............... 710/110

* cited by examiner

*Primary Examiner* — Daquan Zhao
(74) *Attorney, Agent, or Firm* — Volpe and Koenig, P.C.

(57) ABSTRACT

A method and apparatus for video playback includes coordinating a display of a video playback on a first device so as to be synchronized to a display of the video at a second device in response to the first device departing a control territory associated with the second device.

33 Claims, 5 Drawing Sheets

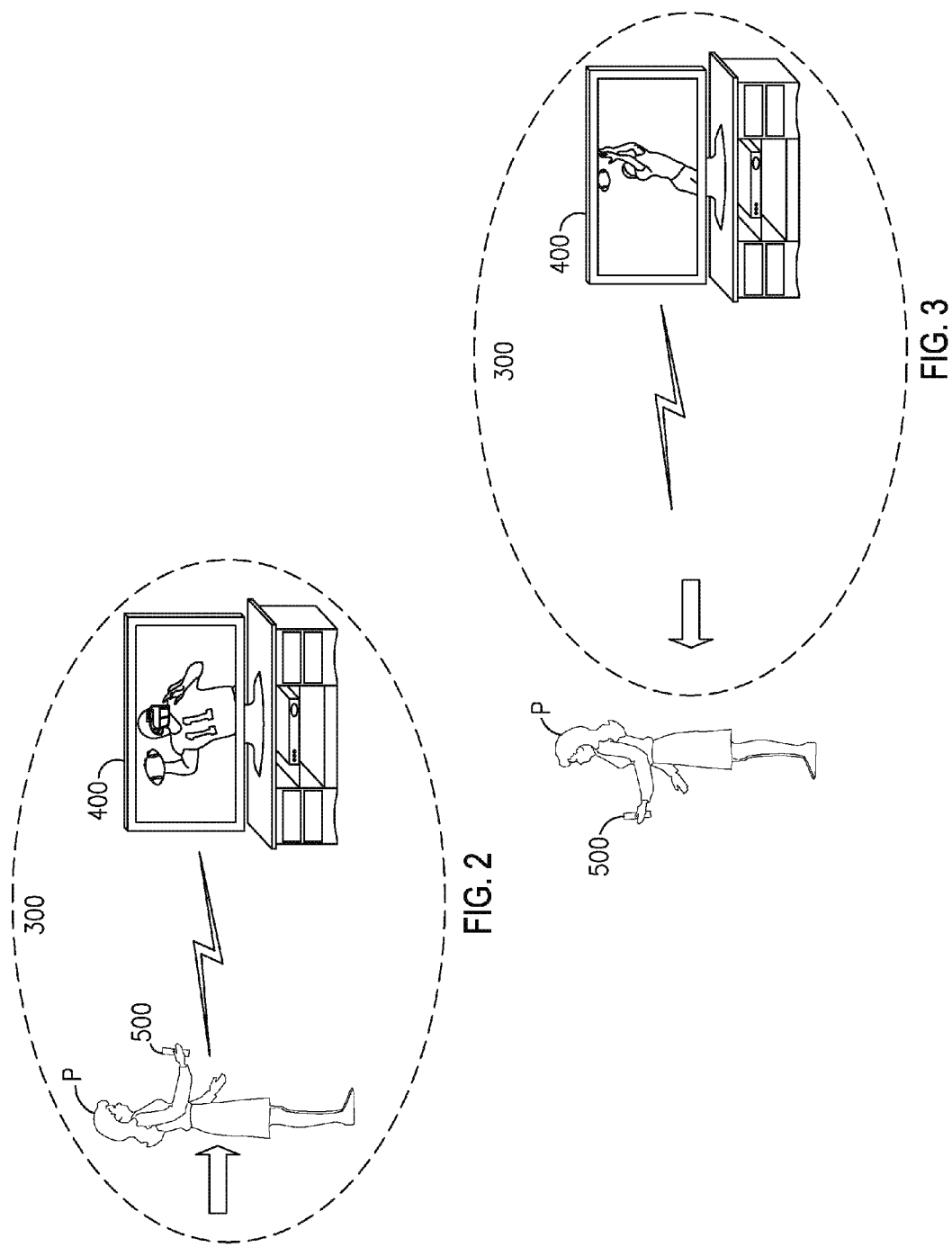

PROXIMITY-BASED VIDEO PLAYBACK SYNCHRONIZATION

FIELD OF THE INVENTION

The present invention is generally directed to video playback, and in particular, to proximity based video playback synchronization.

BACKGROUND

The viewing of a video program, such as a television program, movie, or sporting event, is rarely enjoyed without being interrupted by some activity that requires a viewer to leave the room where the program is being viewed. Distractions such as necessary bathroom breaks, telephone calls, and snack breaks often require the viewer to leave the viewing area, and consequently miss part of the displayed video program.

One solution to this problem is to utilize a time-shifted approach, where the broadcast is "paused" during the time that the viewer needs to leave the viewing area. However, although this may be a solution in some cases, there are a number of instances where it is undesirable or impossible to pause the broadcast for a break. For example, if the program is live and unable to be recorded and/or timeshifted, the viewer departing will result in him missing a portion of the program. Additionally, even for a program that can be time-shifted by pausing, it may undesirable to do so because there may be others in the viewing area watching the broadcast who would be inconvenienced by having their viewing experience interrupted.

SUMMARY OF EMBODIMENTS

An embodiment directed to a method for video playback, (e.g., streaming), is disclosed. The method includes coordinating a display of a video playback on a first device synchronized to a display of the video at a second device in response to the first device departing a control territory associated with the second device.

A further embodiment of aspects of the invention directed to an apparatus is disclosed including a wireless transmitter, a wireless receiver, and a processor in communication with the wireless transmitter and the wireless receiver. The processor is to detect via the wireless receiver whether the apparatus has entered a control territory of a second apparatus, and to coordinate a synchronized display of a video playback on the apparatus to a display of a video at the second apparatus in response to the apparatus departing a control territory associated with the second apparatus.

A further embodiment of aspects of the invention directed to an apparatus is disclosed including a wireless transmitter, a wireless receiver, and a processor in communication with the wireless transmitter and the wireless receiver. The processor is to detect via the wireless receiver whether a second apparatus has entered a control territory of the apparatus, and to coordinate a synchronized display of a video playback on the apparatus to a display of a video at the second apparatus in response to the second apparatus departing the control territory associated with the apparatus.

A further embodiment of aspects of the invention directed to a non-transitory computer-readable storage medium is disclosed. The non-transitory computer-readable storage medium includes a first set of instructions, which when executed by a processor, allow the processor to coordinate a display of a video playback on a first device synchronized to a display of the video at a second device in response to the first device departing a control territory associated with the second device.

A further embodiment directed to a method implemented in an apparatus is disclosed. The method includes detecting whether the apparatus has entered a control territory of a second apparatus, and coordinating a synchronized display of a video playback on the apparatus to a display of the video at the second apparatus in response to the apparatus departing a control territory associated with the second apparatus.

A further embodiment directed to a method implemented in an apparatus is disclosed. The method includes detecting whether a second apparatus has entered a control territory of the apparatus, and coordinating a synchronized display of a video playback on the apparatus to a display of the video at the second apparatus in response to the second apparatus departing the control territory associated with the apparatus.

BRIEF DESCRIPTION OF THE DRAWINGS

A more detailed understanding may be had from the following description, given by way of example in conjunction with the accompanying drawings wherein:

FIG. 2 is a schematic representation of a proximity based video playback system showing a portable device entering a control territory according to an embodiment;

FIG. 3 is a schematic representation of a proximity based video playback system showing a portable device exiting the control territory according to an embodiment;

DETAILED DESCRIPTION OF THE EMBODIMENTS

A proximity-based video playback synchronization mechanism allows a viewer to continue viewing a displayed video program after the viewer has exited a control territory associated with a display system originally displaying the video program. The displayed video program may be a broadcast program, a multicast program, a unicast streamed video, a recorded program, or any other type of video program that could be displayed on a video display.

Figure 1:
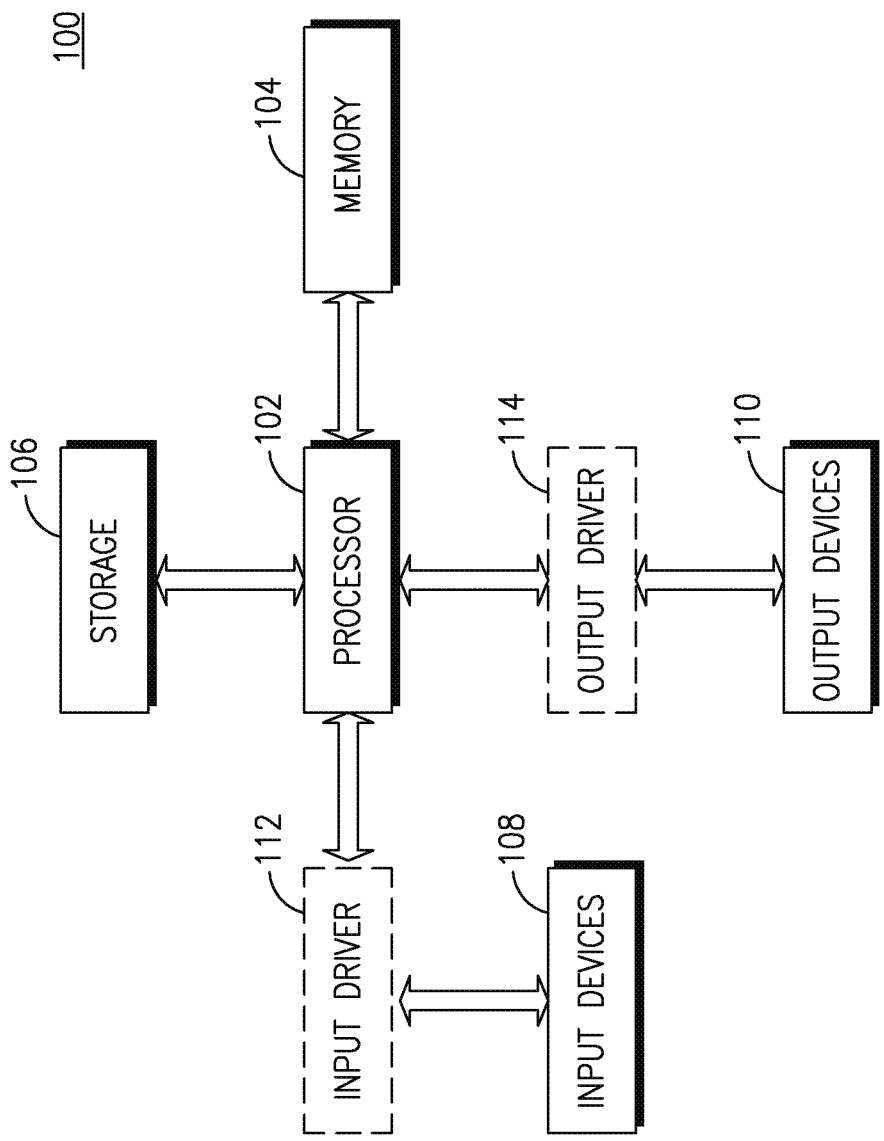
FIG. 1 is a block diagram of an example device in which one or more disclosed embodiments may be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display, and only include a source device of video. In this way, the control territory may be an office environment with a plurality of portable devices and no main display.

FIG. 2 is a schematic representation of a proximity based video playback system showing a portable device 500 entering a control territory 300. Although for purposes of example a single portable device 500 is shown in FIG. 2, it is noted that the system may include any number of portable devices 500 which may enter the control territory 300. In FIG. 2, a person "P" is shown entering the control territory 300 in the direction of the arrow. A main display device 400 displays a video program for which viewers in the viewing area may view the program. The person entering the control territory 300 is shown to be carrying the portable device 500, which may be a smartphone, tablet, or the like. Although further detail regarding a synchronization process will be described below, generally, when the portable device 500 enters the control territory 300 of the main display 400, the portable device 500 is registered for potential synchronized video playback, (e.g., streaming). In this manner, should the portable device 500 exit the control territory 300, video can be played on it, such as being streamed to it.

FIG. 3 is a schematic representation of a proximity based video playback system showing the portable device 500 exiting the control territory 300. As shown, the person is exiting the control territory 300 in the direction of the arrow, thereby taking the portable device 500 out of the control territory 300. Again, although further detail regarding the process will be described below, generally, when the portable device 500 exits the control territory 300 of the main display 400, the main display 400, or a device associated with the main display 400, can enable playback of video data, (e.g., stream video), to the portable device 500 such that the display of the video at the portable device 500 is synchronized to the display of the video at the main display 400. In this way, the person can view the video synchronously on the portable device 500 even as the person leaves the proximity of the main display 400.

Although a more detailed description of the mechanism is described below with regard to methods 600 and 700, in general, one or more portable device (such as portable device 500), is registered with a main display, (e.g., main display 400). When the viewer exits the viewing area, (e.g., control area, or "territory", 300), the video displayed by the main display is synchronously played back, (e.g., streamed), on the portable device to allow the viewer to continue enjoying the program uninterrupted.

Figure 4:
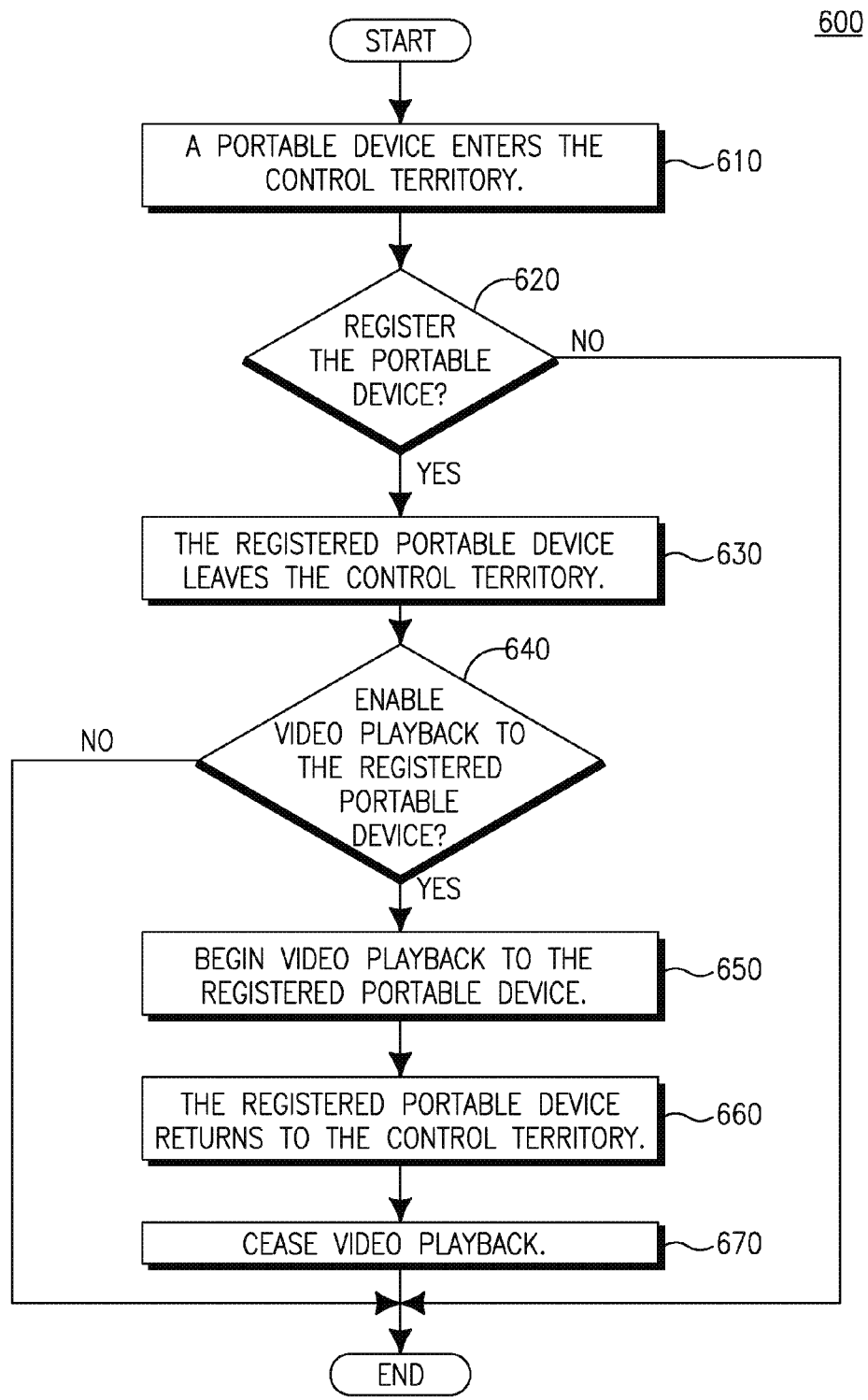
FIG. 4 is a flow diagram of an example method for providing proximity based video playback according to an embodiment.

FIG. 4 is a flow diagram of an example method 600 for providing proximity based video playback. In method 600, the general control of the video playback is performed by the main display 400. In step 610, the viewer enters the control territory of the main display 400. The control territory may be defined by a boundary. For example, the control boundary may be defined as a predefined radius around the main display 400. Some non-limiting examples of how the viewer's position relative to the control territory could be determined are via GPS coordinates broadcast by the viewer's portable device 500, radio telemetry with the portable device 500, when the portable device 500 registers with the main display 400, detection of signal integrity of the portable device 500, through the use of a transmitted beacon signal, or the like.

Once the portable device 500 is in the control territory, the main display 400 determines whether or not to register it (step 620). This registration may be an automatic registration or a manual registration. For example, the main display 400 may register the portable device 500 by identifying information contained in the portable device 500, (e.g., internet protocol (IP) address or media access control (MAC) address of the portable device 500), that is transmitted to the main display 400 or to a device associated with the main display 400, such as a set-top box or wireless access point. Alternatively, the registration process could be performed manually. For example, the viewer could scan a code, (e.g., quick response (QR) code), associated with the portable device 500 into a scanner associated with the main display 400, or utilize a near field communication (NFC) scanner which detects and registers the portable device 500 when it is placed close to the NFC scanner.

At some point after registration of the portable device 500, the viewer may leave the control territory (step 630), and the main display 400, or its associated device, makes a determination whether or not to enable playback, (e.g., stream video), to the registered portable device 500 (step 640). Factors in making this determination may include whether or not the current video program has ended, and whether or not the registered portable device 500 has been in the control territory 300 for a predetermined period of time. If the registered portable device 500 has not been in the control territory 300 for the predetermined period of time, then video playback is not enabled to it. For example, it may be undesirable to enable playback of video to a device that is merely passing through the control territory 300, but for which the device user is not interested in viewing the video program on the portable device 500.

However, if the registered portable device 500 has been in the control territory for the predetermined period of time, then the main display 400 begins video playback, (e.g., streaming) to the registered portable device 500 (step 650). That is, transmission of the video program is initiated by either the main display 400 or its associated device. The main display 400 or associated device may signal to the registered portable device 500 that video playback is available for viewing. For example, an audible announcement or vibration may be initiated on the registered portable device 500 in order to alert the viewer that video playback, (e.g., the video stream), is available for viewing on the device.

The video playback may be accomplished in a number of ways. For example, the portable device 500 may include an application that runs in the background that is associated with the main display 400. Accordingly, when video playback is initiated in step 650, the transmission may be signaled to the application on the portable device. The main display 400 or associated device may then transmit a video, such as a video stream, through an access point (AP) to the IP address or other unique identifier associated with the portable device 500.

Alternatively, the video could be provided via a low-power wireless connection, such as an Institute of Electrical and Electronics Engineers (IEEE) 802.15 connection, (e.g., Bluetooth®). In another alternative, the main display 400 or associated device may signal a multicast address, which when received by the application in the registered portable device 500, causes the application to register with the multicast address to begin receiving the multicast of the video, (e.g., video stream), via an IEEE 802.11, (e.g., WiFi), connection, a cellular connection, or the like.

Another alternative to providing the video playback may include the main display 400 signaling the application on the registered portable device 500 of a location where the video may be accessed. For example, an IP address, Web address, file location on a networked server, or the like. Additionally, an indicator that provides the current playback position of the video may be provided to the portable device 500. The registered portable device 500 can then begin receiving the video at that source starting at the current playback location.

Additionally, the portable device 500 may include a mechanism for controlling the playback of the video when registered with the main display 400 and within the control territory 300. Playback control may include traditional features of a remote control such as pause, rewind, volume, keyboard, and menu selection.

In step 660, the viewer returns with the portable device 500 to the control territory 300 boundary. In this case, the playback of the video may be terminated, or ceased, on the registered portable device 500 (step 670). For example, once the main display 400 or its associated device detects that the portable device 500 has re-entered the control territory 300 boundary, any transmission from the display 400 or its associated device may discontinue providing video to the portable device 500.

Figure 5:
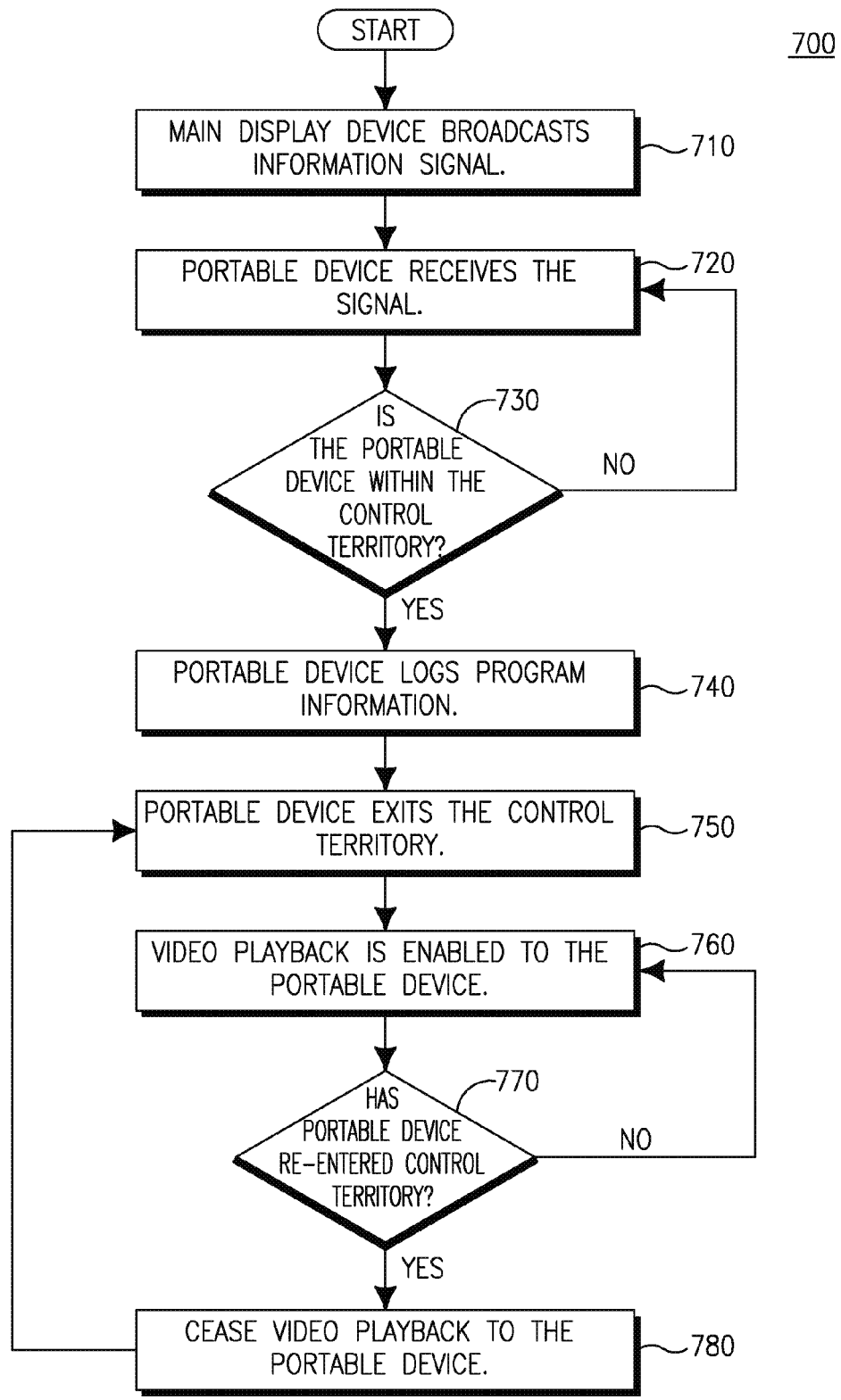
FIG. 5 is a flow diagram of an alternative example method for providing proximity based video playback according to an alternative embodiment.

FIG. 5 is a flow diagram of an alternative example method 700 for providing proximity based video playback. In step 710, the main display 400 or its associated device broadcasts a signal that includes information pertaining to the main display. This information may include an indication of the control territory of the main display 400, the video program being displayed, the current playback position in the program, or the like. This broadcast information of the indication of the control territory 300 of the main display 400 may be by having the signaled indication transmitted at a calibrated strength such that it is only received by devices within the control territory 300, (e.g., a beacon signal from a WiFi AP). Alternatively, the indication of the control territory 300 may include a definition of its boundary. For example, GPS coordinates of the boundary could be provided to the portable device 500.

In one embodiment, the portable device 500 may include an application, such as a video viewing application, for receiving and detecting the signal broadcast from the main display 400 or its associated device (step 720). The portable device 500 then determines if it is inside the control territory 300 (step 730). For example, the portable device 500 could monitor the signal strength and compare it against a predetermined threshold, where if the strength is above the threshold, the portable device 500 determines that it is within the control territory 300. Alternatively, the portable device could utilize the GPS coordinates that may be provided to determine whether or not it is within the boundary of the control territory 300.

If it is not in the control territory 300, and the portable device 500 continues to receive the signal, it then continues to make the determination as to whether it is in the control territory 300, in the case that it subsequently enters the territory. If the portable device 500 determines that it is within the control territory 300 in step 730, then it can begin logging the program information of the video program that is transmitted by the main display 400 or its associated device (step 740). Optionally, the logging step may be delayed until the portable device 500 determines that it has been within the control territory 300 for a predefined period of time.

Should the portable device 500 exit the control territory 300 (step 750), video playback is then enabled to the portable device 500 (step 760). In one embodiment, the information broadcast by the main display 400 or associated device, may include a multicast address for a multicast group. The portable device 500 can join that group to begin playback at the program's current playback location. Alternatively, the information broadcasted by the main display 400 or associated device could include an indication of a source of the video program. For example, an IP address, Web address, file location on a network or server, or the like, could be provided, as well as an indication of the current playback position.

The application on the portable device 500, or the portable device 500 itself, can utilize this information to begin playback of the video program to the portable device 500 starting at the current playback position. If the portable device 500 re-enters the control territory 300 (step 770), then video playback to the portable device 500 may cease (step 780). Otherwise, video playback may continue for as long as the viewer desires.

Figure 6:
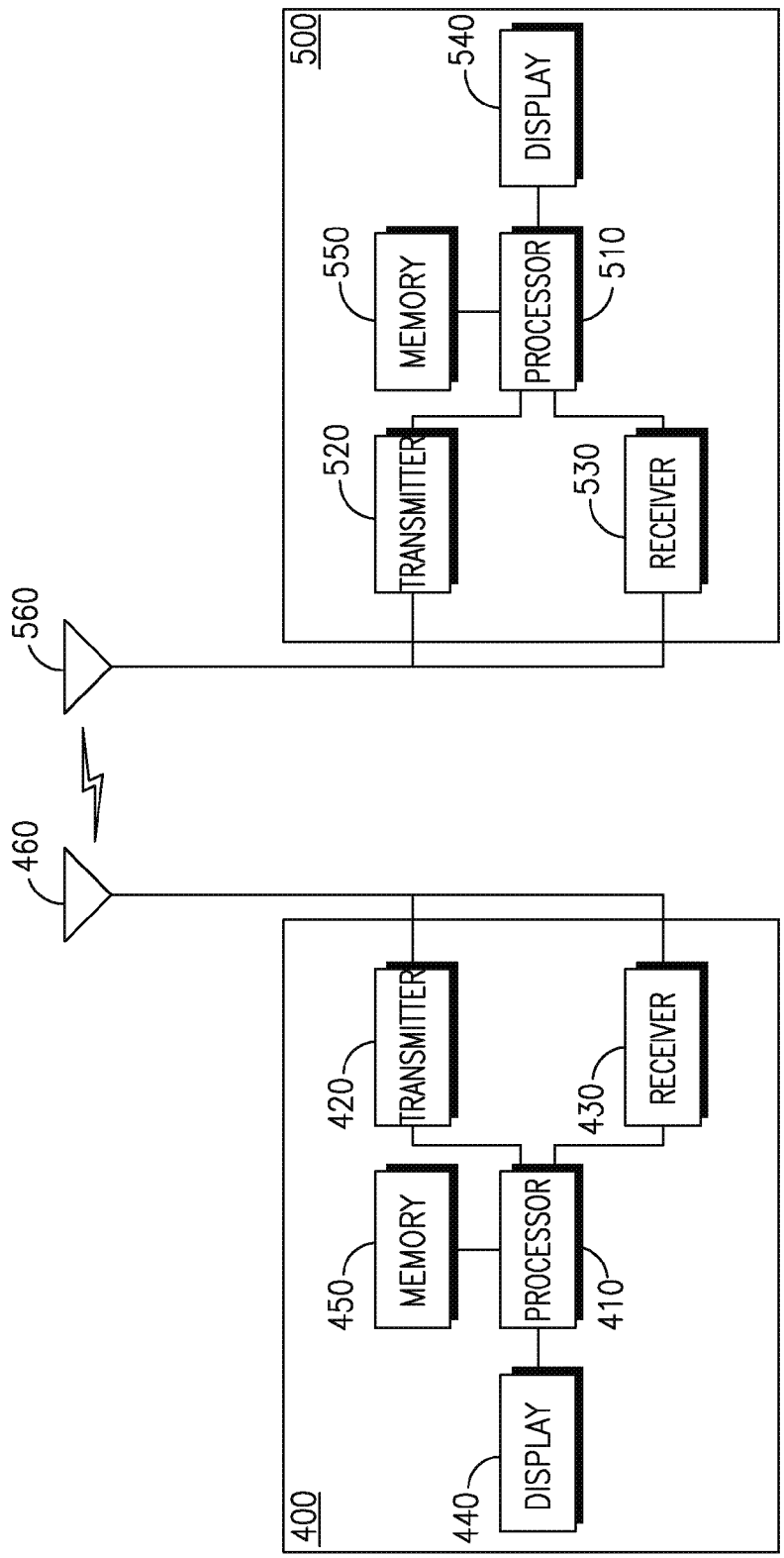
FIG. 6 is an example functional block diagram of a main display and portable device in communication with one another according to an embodiment.

FIG. 6 is an example functional block diagram of the main display 400 and the portable device 500 in communication with one another and configured in accordance with an embodiment. As shown in FIG. 6, both the main display 400 and portable device 500 are configured to perform a method in accordance with the methods 600 or 700 above.

In addition to the components that may be found in a typical main display, the main display 400 includes a processor 410, a transmitter 420, a receiver 430, a display 440, a memory 450, and an antenna 460. The processor 410 is configured to perform a method in accordance with the methods 600 and 700 above. The transmitter 420 and the receiver 430 are in communication with the processor 410, as well as the display 440 and the memory 450. The antenna 460 is in communication with both the transmitter 420 and the receiver 430 to facilitate the transmission and reception of wireless data.

In addition to the components that may be found in a typical portable device, the portable device 500 includes a processor 510, a transmitter 520, a receiver 530, a display 540, a memory 550, and an antenna 560. The processor 510 is configured to perform a method in accordance with the methods 600 and 700 above. The transmitter 520 and the receiver 530 are in communication with the processor 510, as well as the display 540 and the memory 550. The antenna 560 is in communication with both the transmitter 520 and the receiver 530 to facilitate the transmission and reception of wireless data.

It should be understood that many variations are possible based on the disclosure herein. Although features and elements are described above in particular combinations, each feature or element may be used alone without the other features and elements or in various combinations with or without other features and elements.

For example, although the term video stream is used above herein, it may be understood that "video stream" may refer to a stream of video being displayed in combination with other content at the main display, such as a movie being viewed in an application window. It could also refer to a combination of the video and any other content being displayed at the main display.

Additionally, the embodiments described above could be utilized to synchronize a videogame program, where the viewer/player leaves the control territory and the game is provided, (e.g., via streaming), to his or her portable device for continued playing. This could provide one player an opportunity to leave the viewing area if necessary and continue to play his or her part while others are able to continue playing the game in the control territory of the main display.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
   coordinating a display for video playback on a first device so as to be synchronized to a display of video at a second device in response to the first device departing a control territory associated with the second device; and
   terminating the display of the video playback at the first device responsive to the first device reentering the control territory.

2. The method of claim 1 wherein the video playback is displayed on the at least one of the first device and the second device.

3. The method of claim 1 wherein coordinating the display of the video playback on the first device further is responsive to the first device remaining in the control territory for at least a predetermined period of time before departing the control territory.

4. The method of claim 1 wherein coordinating the display of the video playback on the first device comprises at least one of: wirelessly transmitting a video stream from the second device; wirelessly transmitting a multicast address for the video from the second device; and wirelessly transmitting a location of a file representing the video and a current playback position indicator from the second device.

5. The method of claim 1 wherein coordinating the display of the video playback on the first device comprises at least one of: wirelessly receiving a video stream at the first device; wirelessly receiving a multicast address for the video at the first device; and wirelessly receiving a location of a file representing the video and a current playback position indicator at the first device.

6. The method of claim 1, further comprising registering the first device responsive to the first device remaining in the control territory for at least a predetermined period of time.

7. The method of claim 1 wherein the first device coordinates the display of the video playback.

8. The method of claim 7 wherein the first device identifies that it has entered the control territory and receives information relating to the video displayed on the second device.

9. The method of claim 8 wherein the first device determines it has entered the control territory in accordance with any one of the following: determining from GPS coordinates the first device is within the control territory, and receiving a beacon signal from the second device indicating a control territory boundary.

10. The method of claim 7 wherein the first device detects it has departed the control territory.

11. The method of claim 1 wherein the second device coordinates the display of the video playback.

12. The method of claim 11 wherein the second device registers the first device in response to the second device detecting the first device entering the control territory of the second device.

13. The method of claim 12 wherein the second device detecting the first device entering the control territory includes at least one of the following: receiving a beacon signal from the first device; receiving global positioning system (GPS) coordinates from the first device; determining a signal strength of a signal from the first device exceeds a threshold; and radiofrequency triangulation.

14. The method of claim 11 wherein the second device transmits the video to the first device in response to the second device detecting that the first device has departed the control territory.

15. The method of claim 11 wherein the second device provides an indicator of a location of the video to the first device responsive to determining that the first device is has departed in the control territory.

16. The method of claim 15, wherein the indicator includes at least one of: a multicast address of a broadcast of the video; and a location of a file storing the video.

17. The method of claim 15 wherein the second device provides an indicator of a playback location of the video to the first device.

18. A first apparatus, comprising:
   a wireless receiver; and
   a processing system in communication with the wireless receiver, the processing system to detect via the wireless receiver whether the first apparatus has entered a control territory of a second apparatus, and to coordinate a synchronized display of a video playback on the first apparatus to a display of the video at the second apparatus in response to the first apparatus departing a control territory associated with the second apparatus, and wherein the processing system is to terminate the video playback in response to a determination that the first apparatus has reentered the control territory of the second apparatus.

19. The first apparatus of claim 18 wherein the processing system is further to receive at least one of the following: a transmission of the video from the second apparatus; an indication of a location of the video and indicator of a current playback position of the video; and a multicast address where the video is to be accessed.

20. The first apparatus of claim 18 wherein the processing system is further to register the first apparatus with the second apparatus in response to the first apparatus remaining in the control territory for a predetermined period of time.

21. The first apparatus of claim 18 wherein the processing system is further to control playback of the video and display of the video on the first apparatus.

22. A first apparatus, comprising:
a wireless receiver; and
a processing system in communication with the wireless receiver, the processing system to detect via the wireless receiver whether a second apparatus has entered a control territory of the first apparatus, and to coordinate a synchronized display of a video playback on the second apparatus to a display of the video at the first apparatus in response to the second apparatus departing the control territory associated with the first apparatus, and wherein the processor based system is further to terminate video playback to the second apparatus in response to detecting the second apparatus reentering the control territory.

23. The first apparatus of claim 22 wherein the processing system is further to provide the second apparatus at least one of the following in response to the second apparatus departing the control territory: a transmission of a video stream; an indication of a location of the video and indicator of a current playback position of the video; and a multicast address where the video is to be accessed.

24. The first apparatus of claim 22 wherein the processor based system is further to register the second apparatus in response to the second apparatus remaining in the control territory for a predetermined period of time.

25. A non-transitory computer-readable storage medium containing a first set of instructions, which when executed by a processor, manipulate the processor to:
coordinate a display of a video playback on a first device synchronized to a display of the video at a second device in response to the first device departing a control territory associated with the second device; and
terminate the video playback in response to detecting the first device reentering the control territory.

26. The non-transitory computer-readable storage medium of claim 25, further comprising the processor registering the first device in response to the first device remaining in the control territory a predetermined period of time.

27. A method, implemented in a first apparatus, comprising:
detecting whether the first apparatus has entered a control territory of a second apparatus;
coordinating a synchronized display of a video playback on the first apparatus to a display of the video at the second apparatus in response to the first apparatus departing a control territory associated with the second apparatus; and
terminating the video playback in response to a determination that the first apparatus has reentered the control territory of the second apparatus.

28. The method of claim 27, further comprising receiving at least one of the following: a transmission of the video from the second apparatus; an indication of a location of the video and indicator of a current playback position of the video; and a multicast address where the video is to be accessed.

29. The method of claim 27, further comprising registering the first apparatus with the second apparatus in response to the first apparatus remaining in the control territory for a predetermined period of time.

30. The method of claim 27, further comprising controlling playback of the video and display of the video on the first apparatus.

31. A method, implemented in a first apparatus, comprising:
detecting whether a second apparatus has entered a control territory of the first apparatus;
coordinating a synchronized display of a video playback on the second apparatus to a display of the video at the first apparatus in response to the second apparatus departing the control territory associated with the first apparatus; and
terminating the video playback to the second apparatus in response to detecting the second apparatus reentering the control territory.

32. The first apparatus of claim 31, further comprising providing the second apparatus at least one of the following in response to the second apparatus departing the control territory: a transmission of a video stream; an indication of a location of the video and indicator of a current playback position of the video; and a multicast address where the video is to be accessed.

33. The first apparatus of claim 31, further comprising registering the second apparatus in response to the second apparatus remaining in the control territory for a predetermined period of time.

* * * * *

UNITED STATES PATENT AND TRADEMARK OFFICE
CERTIFICATE OF CORRECTION

| | | |
|---|---|---|
| PATENT NO. | : 8,837,898 B2 | Page 1 of 1 |
| APPLICATION NO. | : 13/625364 | |
| DATED | : September 16, 2014 | |
| INVENTOR(S) | : Davidson et al. | |

It is certified that error appears in the above-identified patent and that said Letters Patent is hereby corrected as shown below:

IN THE CLAIMS

In claim 15, column 8, line 46, delete "is"

In claim 15, column 8, line 47, delete "in"

Signed and Sealed this
Second Day of December, 2014

Michelle K. Lee
*Deputy Director of the United States Patent and Trademark Office*